C. A. SANDS.
Sack for Baling Hops.

No. 206,976.　　　　　Patented Aug. 13, 1878.

WITNESSES:
Chas. Nida
C. Sedgwick

INVENTOR:
C. A. Sands
BY Munn & Co
ATTORNEYS.

UNITED STATES PATENT OFFICE.

CHARLES A. SANDS, OF BURLINGTON, KANSAS.

IMPROVEMENT IN SACKS FOR BALING HOPS.

Specification forming part of Letters Patent No. 206,976, dated August 13, 1878; application filed July 1, 1878.

*To all whom it may concern:*

Figure 1:
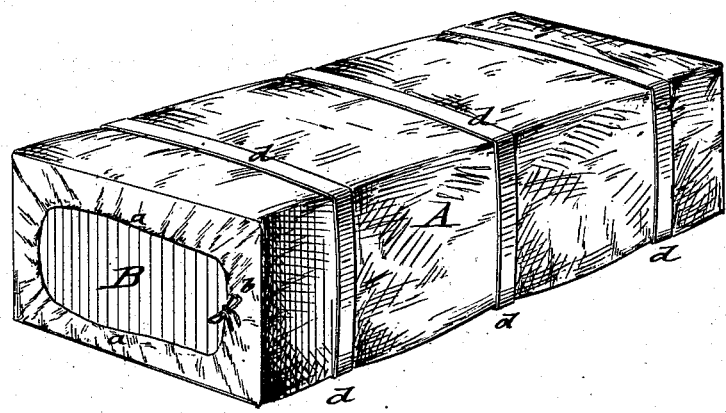
Figure 2:
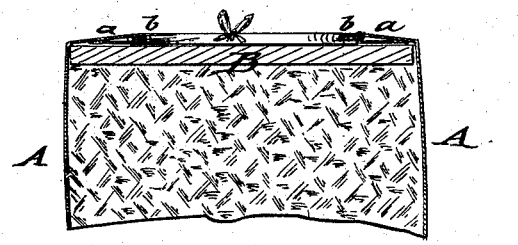

Be it known that I, CHARLES A. SANDS, of Burlington, in the county of Coffee and State of Kansas, have invented a new and useful Improvement in Baling Hops, of which the following is a specification:

In the accompanying drawings, Figure 1 represents a perspective view of my improved hop-bale, and Fig. 2 is a vertical transverse section through one of the heads of the bale.

Similar letters of reference indicate corresponding parts.

The object of this invention is to furnish an improved method of baling hops and other products in compact, quick, and convenient manner; and the invention consists of a sack, open at both ends and hemmed, in connection with heads, over which the sack is tied by means of strings drawn through the hems after the hops are compressed.

Referring to the drawings, A represents a sack of suitable fabric, that is made on the sewing-machine, open at both ends, and arranged with hems $a$ along the edges of both ends.

An oblong wooden head, B, of the size of the sack, is placed in position at the lower part of the same, and retained by tying the lower end of the sack by a string, $b$, drawn through the hem.

When the hops have been compressed in the sack above the lower head, a second head, B, is placed on the top of the hops by the press-follower, and then the upper hem of the sack drawn and tied tightly by a string over the upper head. The bale is then, for greater strength, hooped with one or more bands or wires, $d$, and thereby a compact hop-bale, that is protected all around, obtained, which is more conveniently pressed, shipped, and handled than the hop-bales now in use.

Having thus described my invention, I claim as new and desire to secure by Letters Patent—

A bale for hops, &c., consisting of a sack being open at the ends, and provided with hemmed edges, in connection with heads secured by strings passed through the hems, tied over the heads, substantially as and for the purpose set forth.

CHAS. A. SANDS.

Witnesses:
PAUL GOEPEL,
C. SEDGWICK.